US012196298B1

(12) United States Patent
Spore et al.

(10) Patent No.: US 12,196,298 B1
(45) Date of Patent: Jan. 14, 2025

(54) TORQUE CONVERTER BLADE ASSEMBLY WITH BRACED TAB

(71) Applicant: Schaeffler Technologies AG & Co. KG, Herzogenaurach (DE)

(72) Inventors: Keith Spore, Wooster, OH (US); Randy Keller, Polk, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/410,311

(22) Filed: Jan. 11, 2024

(51) Int. Cl.
*F16H 41/28* (2006.01)
*F16H 41/26* (2006.01)

(52) U.S. Cl.
CPC ............. *F16H 41/28* (2013.01); *F16H 41/26* (2013.01)

(58) Field of Classification Search
CPC .................................. F16H 41/26; F16H 41/28
See application file for complete search history.

(56) References Cited

U.S. PATENT DOCUMENTS

| | | | |
|---|---|---|---|
| 2,311,958 A | 2/1943 | Neracher et al. | |
| 8,434,300 B2 | 5/2013 | Marathe | |
| 9,328,812 B2 * | 5/2016 | Szuba | F16H 41/24 |
| 10,428,924 B2 * | 10/2019 | Yin | F16H 41/28 |
| 10,788,111 B2 * | 9/2020 | Vanni | F16H 57/0476 |
| 2015/0267795 A1 | 9/2015 | Gurney | |

* cited by examiner

*Primary Examiner* — Courtney D Heinle
*Assistant Examiner* — Danielle M. Christensen

(57) ABSTRACT

A blade assembly for a torque converter includes a shell extending annularly about an axis and defining an inner surface and a plurality of blades arranged around the inner surface of the shell. The plurality of blades each include a curved portion contacting the inner surface. The plurality of blades each further include a brace including a first leg and a second leg each extending circumferentially from the curved portion relative to the axis. The second leg is radially spaced from the first leg relative to the axis. The plurality of blades each further include a tab disposed radially between the first leg and the second leg relative to the axis. The tab extends axially from the curved portion relative to the axis.

16 Claims, 3 Drawing Sheets

12,196,298 B1

TORQUE CONVERTER BLADE ASSEMBLY WITH BRACED TAB

TECHNICAL FIELD

The present disclosure relates generally to a blade assembly, and more specifically to torque converter including the blade assembly.

BACKGROUND

Torque converters include blade assemblies including a shell, a core ring, and blades to direct fluid flow. The blades are arranged around a circumference of the shell and the core ring and are typically attached to the shell by brazing. Directing the fluid flow creates stress on the blades, which can adversely impact the durability and service life of the blades. It is desirable to have alternative designs and configurations to reduce stress on the blades caused by directing fluid flow in the torque converter.

SUMMARY

Embodiments of this disclosure provide a blade assembly for a torque converter including a shell extending annularly about an axis and defining an inner surface. The blade assembly further includes a plurality of blades arranged around the inner surface of the shell. The plurality of blades each include a curved portion contacting the inner surface. The plurality of blades each further include a brace including a first leg and a second leg each extending circumferentially from the curved portion relative to the axis. The second leg is radially spaced from the first leg relative to the axis. The plurality of blades each further include a tab disposed radially between the first leg and the second leg relative to the axis. The tab extends axially from the curved portion relative to the axis.

In embodiments, the shell may include a groove extending at least partially therethrough, the tab arranged in the groove. The brace may abut the inner surface.

In embodiments, the blade assembly may further include two relief holes radially spaced from each other. The relief holes may each define a portion of the tab. One of the relief holes may extend through a portion of the first leg, and the other of the relief holes may extend through a portion of the second leg. The relief holes each may extend through a portion of the curved portion. The brace may include an opening corresponding to a size and a shape of the tab.

In embodiments, the tab may be fixed to the shell. The brace may be fixed to the shell. In embodiments, the brace may include a bridge extending from the first leg to the second leg. The bridge may be circumferentially spaced from the curved portion relative to the axis.

Embodiments of this disclosure further provide a blade for a torque converter including a curved portion configured to contact an inner surface of a shell. The blade further including a brace including a first leg and a second leg each extending laterally from the curved portion. The second leg is spaced from the first leg. The blade further including a tab disposed between the first leg and the second leg. The tab extends outwardly from the curved portion In embodiments, the brace may be configured to contact the inner surface of the shell. In embodiments, the brace may include a bridge extending from the first leg to the second leg. The bridge may be spaced from the curved portion.

In embodiments, the blade may include two relief holes radially spaced from each other. The relief holes each may define a portion of the tab. One of the relief holes may extend through a portion of the first leg, and the other of the relief holes may extend through a portion of the second leg. The tab may be formed from the brace.

Embodiments of this disclosure further provide a method for assembly a blade assembly of a torque converter. The method includes providing a blank. The method further includes stamping the blank to form a blade having a curved portion and a brace. The brace includes a first leg and a second leg each extending laterally from the curved portion. The method further includes forming the brace to form a tab extending outwardly from the curved portion. The tab being arranged between the first leg and the second leg. The method further includes providing a shell having a groove extending at least partially therethrough. The method further includes inserting the tab into the groove. The brace contacts an inner surface of the shell. The method further includes fixing the blade to the shell.

In embodiments, fixing the blade to the shell may include fixing the tab to the shell. In embodiments, fixing the blade to the shell may include fixing the brace to the shell. In embodiments, the brace may be formed via lancing.

Embodiments disclosed herein provide the advantageous benefit of providing a tab and a brace that abuts the inner surface of the shell around the tab, which reinforces the tab. Thus, the durability and service life of blades are increased, contributing to an increase in the durability and service life of blade assembly.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
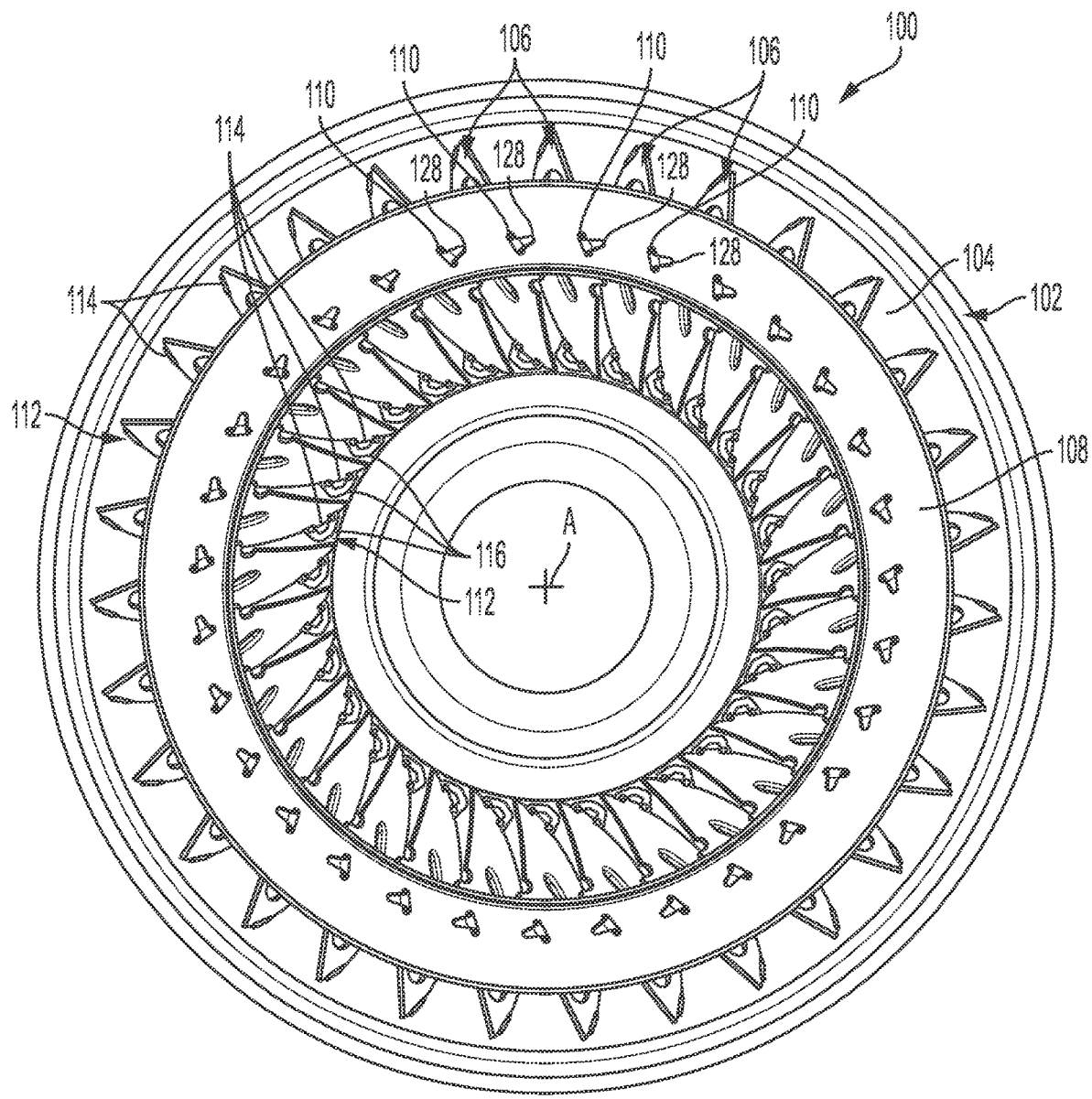
FIG. 1 illustrates a top view of a blade assembly according to an exemplary embodiment of the present disclosure.
Figure 2:
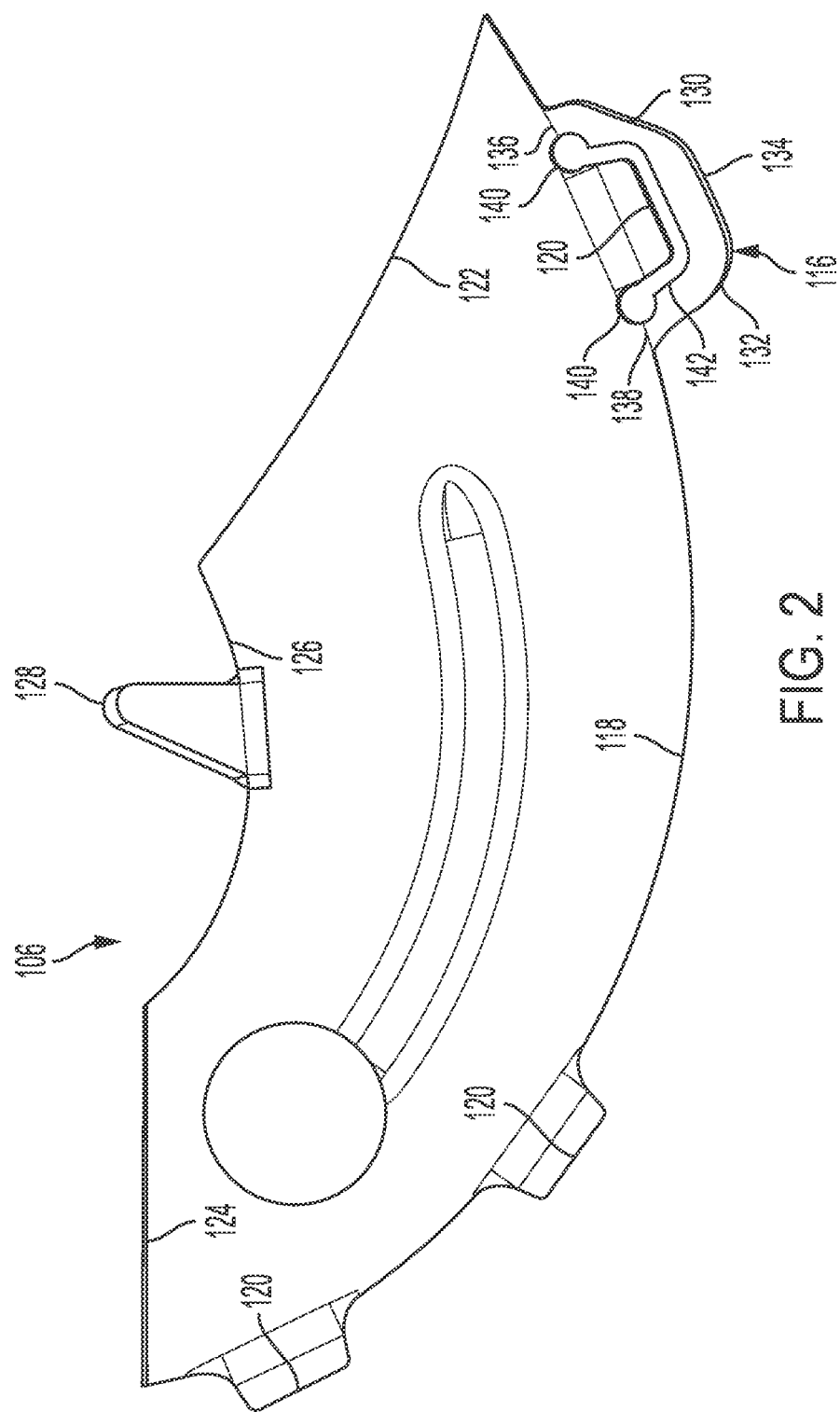
FIG. 2 illustrates a perspective view of a single blade from the blade assembly of FIG. 1.

Referring to FIGS. 1-2, a blade assembly 100 for a torque converter is illustrated according to one embodiment of the present disclosure. Words such as "axial," "radial," "circumferential," "outward," etc. as used herein are intended to be with respect to a central axis A shown in FIG. 1.

The blade assembly 100 includes a shell 102 extending annularly about the central axis A and defining an inner surface 104, a plurality of blades 106 arranged around the inner surface 104, and a core ring 108 extending annularly about the central axis A and connected to each of the plurality of blades 106. The blade assembly 100 may be, for example, referred to as an "impeller assembly." In such an example, the shell 102 may be non-rotatably connected to a front cover of the torque converter. The front cover is arranged to receive a torque. Alternatively, the blade assembly 100 may be referred to as a "turbine assembly." In such an example, the shell 102 may be disposed axially between the front cover and an impeller assembly. The torque converter may include one or more blade assemblies 100. For example, the torque converter may include one blade assembly 100, e.g., an impeller assembly or a turbine assembly. As another example, the torque converter may include two blade assemblies 100, e.g., an impeller assembly and a turbine assembly. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The shell 102 includes a row 112 of grooves 114 arranged on the inner surface 104. The grooves 114 may be spaced from each other circumferentially about the central axis A. Each groove 114 is arranged to engage one respective blade 106. That is, the blade assembly 100 includes a same number of grooves 114 as blades 106. The grooves 114 may, for example, extend partially through the shell 102, i.e., are spaced from an exterior surface of the shell 102. As another example, the grooves 114 may extend entirely through the shell 102, i.e., through the exterior surface. The shell 102 may include one or more rows 112 of grooves 114. In an example in which the shell 102 includes a plurality of rows 112 of grooves 114, the rows 112 may be radially spaced from each other.

The blades 106 are arranged circumferentially around the inner surface 104 of the shell 102. Each blade 106 includes a curved portion 118 that is configured to abut the inner surface 104 of the shell 102. Each blade 106 includes a curved region 126 axially spaced from the curved portion 118. The curved region 126 includes a radially extending tab 128. The radially extending tab 128 is engaged with the core ring 108. The core ring 108 includes a plurality of slots 110 circumferentially spaced from each other about the central axis A. Each slot 110 is arranged to receive one respective radially extending tab 128. An interface between the slots 110 and the radially extending tabs 128 connects the blades 106 to the core ring 108.

Each blade 106 further includes a first end 122 and a second end 124 radially spaced from the first end 122. The curved portion 118 extends from the first end 122 to the second end 124. The first end 122 extends from the curved portion 118 to the curved region 126. The second end 124 extends from the curved portion 118 to the curved region 126. The first end 122 is arranged radially inside of the second end 124.

Each blade 106 includes a tab 120 extending outwardly from the curved portion 118. The blades 106 includes a same number of tabs 120 as each other. Each blade 106 may include one or more tabs 120. In the embodiment shown in the Figures, each blade 106 includes three tabs 120 spaced from each other along the curved portion 118. Each blade 106 includes a same number of tabs 120 as a number of rows 112 of grooves 114. Each tab 120 is arranged to be received in one respective groove 114 in one corresponding row 112.

Each blade 106 includes a brace 116 extending circumferentially from the curved portion 118. Each brace 116 and one respective tab 120 may be a unitary, i.e., single piece, construction. For example, each brace 116 may be formed by stamping and then one respective tab 120 may be formed therefrom, as discussed further below. Each brace 116 abuts the inner surface 104 of the shell 102 to reinforce the one respective tab 120. Each blade 106 may include one or more braces 116. Each blade 106 may include a different number of braces 116 than a number of tabs 120. For example, in the embodiments shown in the Figures, each blade 106 includes one brace 116 and three tabs 120. Alternatively, each blade 106 may include a same number of braces 116 as a number of tabs 120.

Each brace 116 and the one respective tab 120 extend transversely relative to each other. That is, each brace 116 and the one respective tab 120 extend in transverse planes relative to the curved portion 118. Each brace 116 extends laterally from the curved portion 118, and the one respective tab 120 extends outwardly from the curved portion 118.

Each brace 116 includes a first leg 130, a second leg 132, and a bridge 134. The first leg 130 and the second leg 132 each extending circumferentially from the curved portion 118 relative to the axis A. The first leg 130 includes a first base 136 arranged radially inward of the one respective tab 120 relative to the axis A. For example, in the embodiment shown in the Figures, the first base 136 is radially between the first end 122 and the tab 120. The first leg 130 extends from the first base 136 to the bridge 134. The bridge 134 extends radially outwardly from the first leg 130 to the second leg 132 relative to the axis A. The bridge 134 is circumferentially spaced from the curved portion 118 relative to the axis A. The second leg 132 includes a second base 138 arranged radially rearward of the one respective tab 120 relative to the axis A. That is, the one respective tab 120 is disposed radially between the first base 136 and the second base 138 relative to the axis A. The second leg 132 extends from the bridge 134 to the second base 138.

Each brace 116 further includes two relief holes 140. One relief hole 140 being arranged at the first base 136 and extending through a portion of the first leg 130, and the other relief hole 140 being arranged at the second base 138 and extending through a portion of the second leg 132. Each relief hole 140 may further extending through a portion of the curved portion 118. Each relief hole 140 may partially define the tab 120. That is, at least a portion of a surface defining each relief hole 140 may also define at least a portion of the tab 120. The relief holes 140 may have a diameter between 2.0-2.5 millimeters (mm), inclusive.

Figure 3:
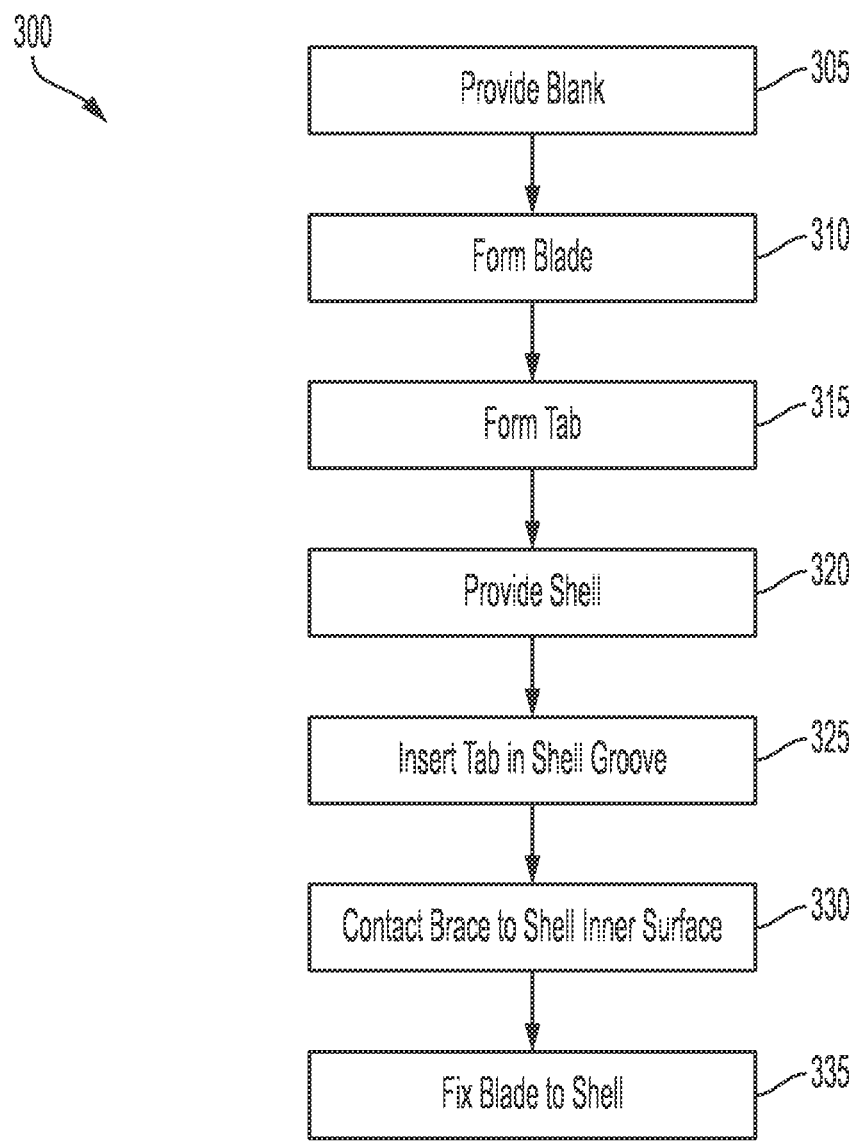
FIG. 3 illustrates a flowchart of a process for assembling the blade assembly according to the exemplary embodiment of the present disclosure.

Referring to FIG. 3, a flowchart of a process 300 for assembling the blade assembly 100 of this disclosure is shown. However, it is to be understood that the process 300 may include fewer steps and/or the steps may be executed in a different order. The process 300 beings in a block 305 by providing a blank. In a block 310, the blank is stamped to form a blade 106 having a brace 116 extending laterally from a curved portion 118 of the blade 106. Additionally, the blade 106 may include one or more tabs 120 extending outwardly from the curved portion 118 and spaced from the brace 116 along the curved portion 118. Further, the brace 116 includes the relief holes 140 that partially define the tab 120. The relief holes 140 may be formed in the block 310 or in a subsequent manufacturing process, e.g., drilling. In a block 315, the tab 120 is formed, e.g., via a piercing operation such as lancing, the brace 116 between the relief holes 140, e.g., along the first leg 130, the bridge 134, and the second leg 132. After forming, the tab 120 extends outwardly from the curved portion 118 and is arranged between a first base 136 and a second base 138 of the brace 116, as described above. Further, the brace 116 includes an opening 142 resulting from the formation of the tab 120. That is, the opening 142 corresponds to a size and a shape of the tab 120. The opening 142 is bounded in part by the first leg 130, the bridge 134, the second leg 132, and the relief holes 140. In a block 320, a shell 102 having one or more grooves 114 extending at least partially therethrough is provided. In a block 325, the one or more tabs 120 are inserted into corresponding grooves 114. In a block 330, the blade 106 is arranged such that the brace 116 contacts an inner surface 104 of the shell 102. In a block 335, the blade 106 is fixed to the shell 102. For example, the tab(s) 120 are fixed to the shell 102 in the respective grooves 114, e.g., via a brazing process. Additionally, the brace 116 may be fixed to the inner surface 104, e.g., via the same brazing process utilized to fix the tab(s) 120 to the shell 102. Forming the brace 116 and subsequently forming the tab 120 from the brace 116 reduces waste by utilizing strip material presenting during the block 310. Additionally, the brace 116 provides increased structural support for the tab 120.

Embodiments according to the present disclosure provide various advantages including improving the durability and service life of a blade assembly by providing a blade having a brace and a tab formed therefrom, which increases structural support for the tab.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 blade assembly
102 shell
104 inner surface
106 blade
108 core ring
110 slot
112 row
114 groove
116 brace
118 curved portion
120 tab
122 end
124 end
126 curved region
128 radially extending tab
130 leg
132 leg
134 brace
136 base
138 base
140 relief hole
142 opening
A central axis

What is claimed is:

1. A blade assembly for a torque converter, comprising:
a shell extending annularly about an axis and defining an inner surface;
a plurality of blades arranged around the inner surface of the shell, the plurality of blades each including:
a curved portion contacting the inner surface;
a brace including a first leg and a second leg each extending circumferentially from the curved portion relative to the axis, wherein the second leg is radially spaced from the first leg relative to the axis; and
a tab disposed radially between the first leg and the second leg relative to the axis, the tab extending axially from the curved portion relative to the axis, wherein the brace includes an opening corresponding to a size and a shape of the tab.

2. The blade assembly of claim 1, wherein the shell includes a groove extending at least partially therethrough, the tab arranged in the groove.

3. The blade assembly of claim 2, wherein the brace abuts the inner surface.

4. The blade assembly of claim 1, further comprising two relief holes radially spaced from each other, the relief holes each defining a portion of the tab.

5. The blade assembly of claim 4, wherein one of the relief holes extends through a portion of the first leg, and the other of the relief holes extends through a portion of the second leg.

6. The blade assembly of claim 4, wherein the relief holes each extend through a portion of the curved portion.

7. The blade assembly of claim 1, wherein the tab is fixed to the shell.

8. The blade assembly of claim 7, wherein the brace is fixed to the shell.

9. The blade assembly of claim 1, wherein the brace includes a bridge extending from the first leg to the second leg, the bridge is circumferentially spaced from the curved portion relative to the axis.

10. A blade assembly for a torque converter, comprising:
a shell extending annularly about an axis and defining an inner surface;
a plurality of blades arranged around the inner surface of the shell, the plurality of blades each including:
a curved portion contacting the inner surface;
a brace including a first leg and a second leg each extending circumferentially from the curved portion relative to the axis, wherein the second leg is radially spaced from the first leg relative to the axis;

a tab disposed radially between the first leg and the second leg relative to the axis, the tab extending axially from the curved portion relative to the axis; and two relief holes radially spaced from each other, the relief holes each defining a portion of the tab and extending through a portion of the curved portion.

11. The blade assembly of claim 10, wherein the shell includes a groove extending at least partially therethrough, the tab arranged in the groove.

12. The blade assembly of claim 11, wherein the brace abuts the inner surface.

13. The blade assembly of claim 10, wherein one of the relief holes extends through a portion of the first leg, and the other of the relief holes extends through a portion of the second leg.

14. The blade assembly of claim 10, wherein the tab is fixed to the shell.

15. The blade assembly of claim 14, wherein the brace is fixed to the shell.

16. The blade assembly of claim 10, wherein the brace includes a bridge extending from the first leg to the second leg, the bridge is circumferentially spaced from the curved portion relative to the axis.

\* \* \* \* \*